April 2, 1940.  N. BARTLETT  2,196,093
AMUSEMENT RIDE
Filed April 2, 1938  6 Sheets-Sheet 1
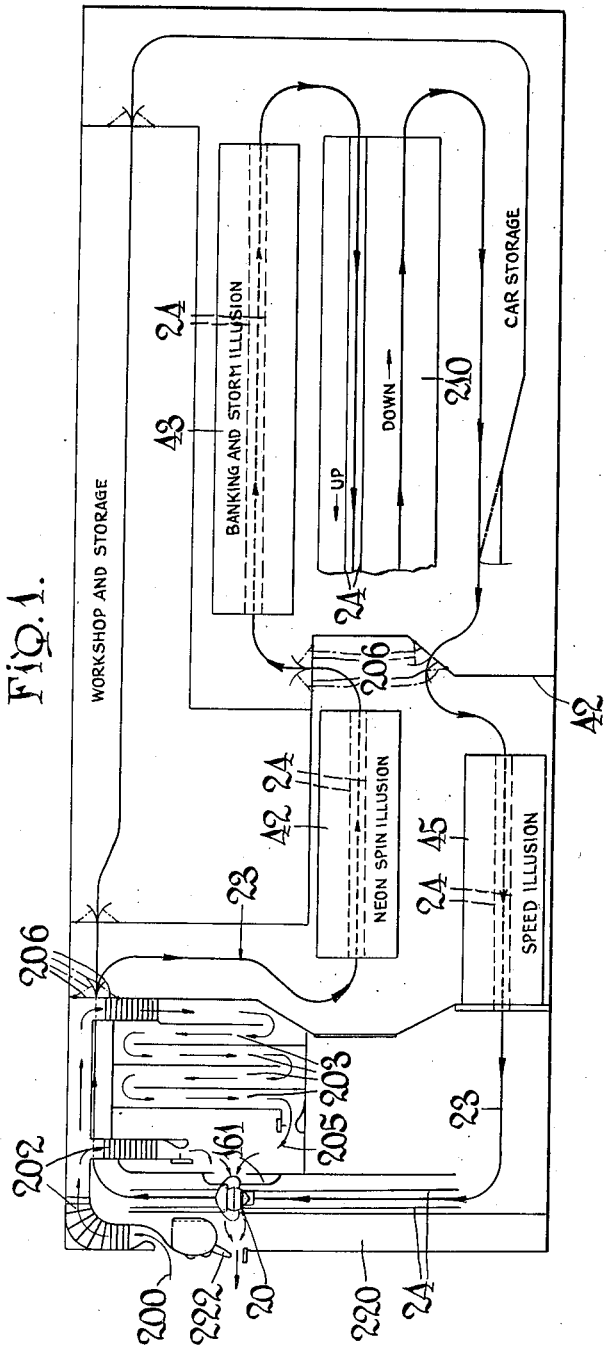
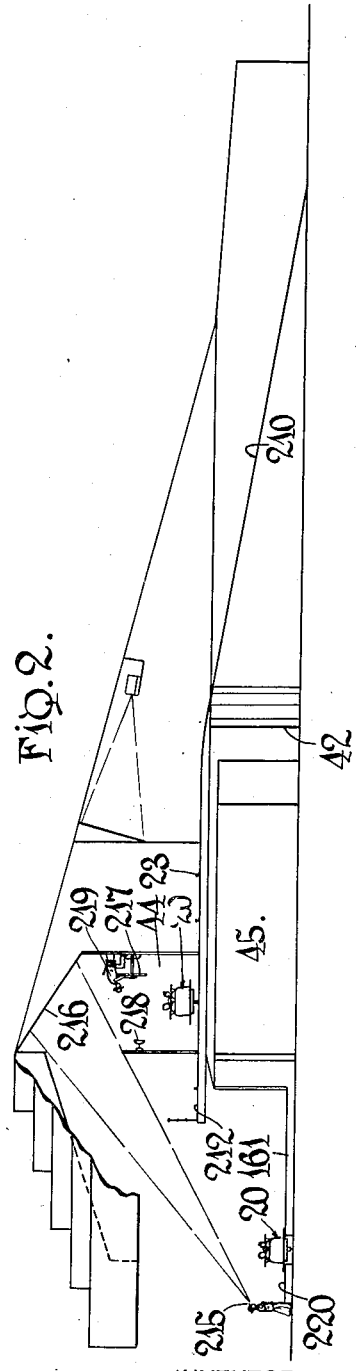
INVENTOR
Norman Bartlett,
BY
Beau, Brooks, Buckley & Beau.
ATTORNEYS

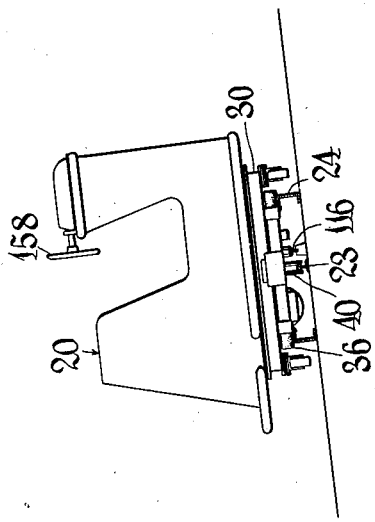
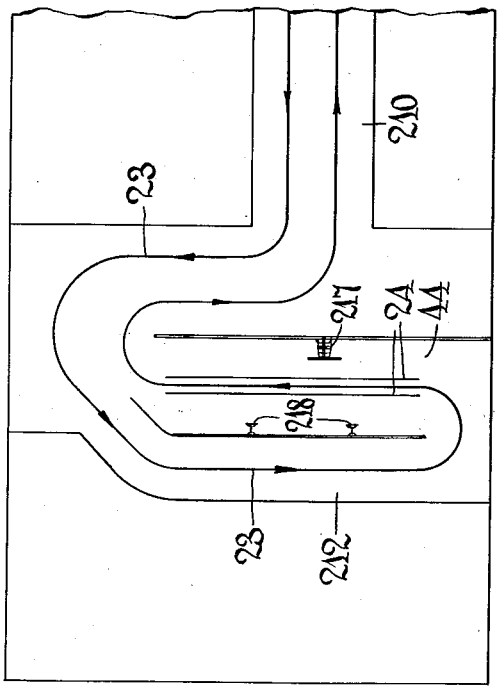
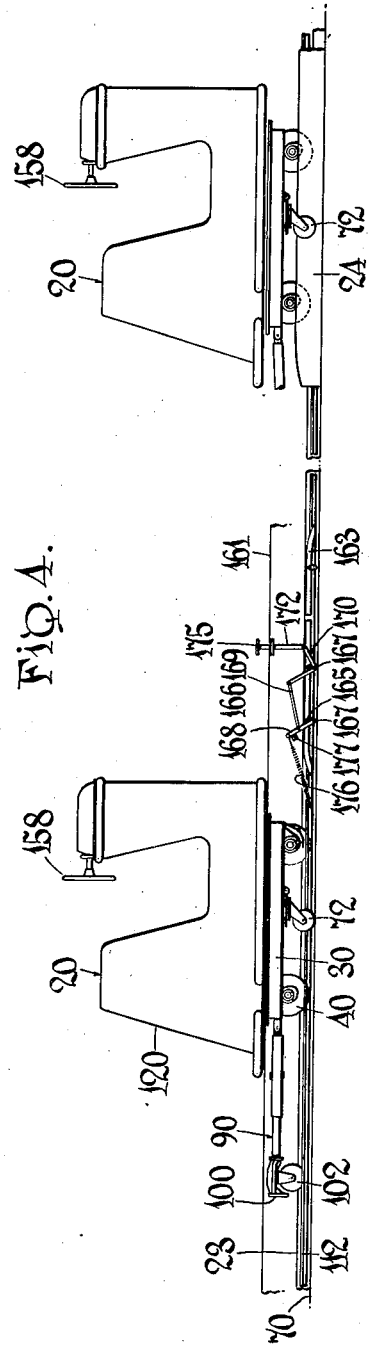

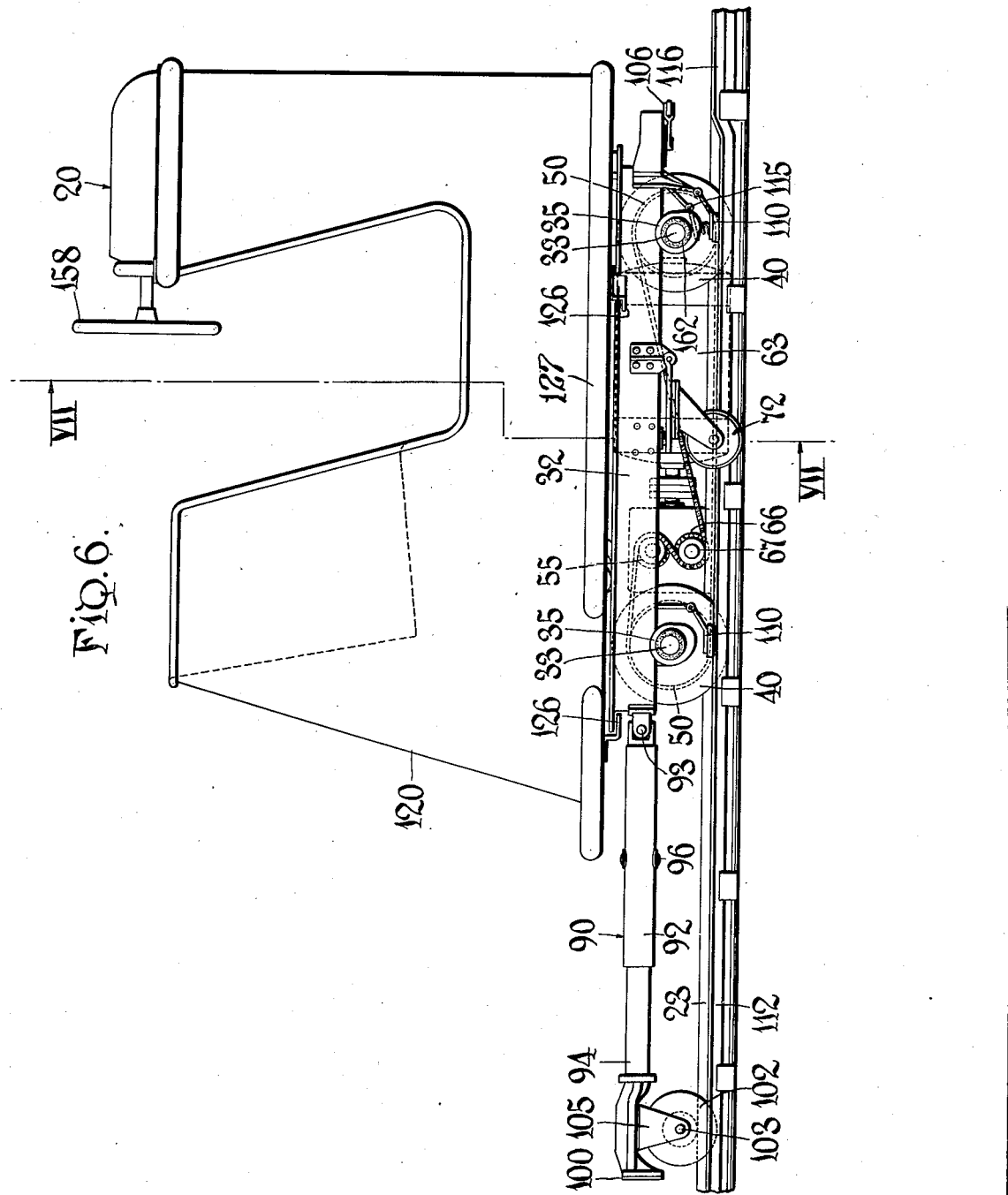

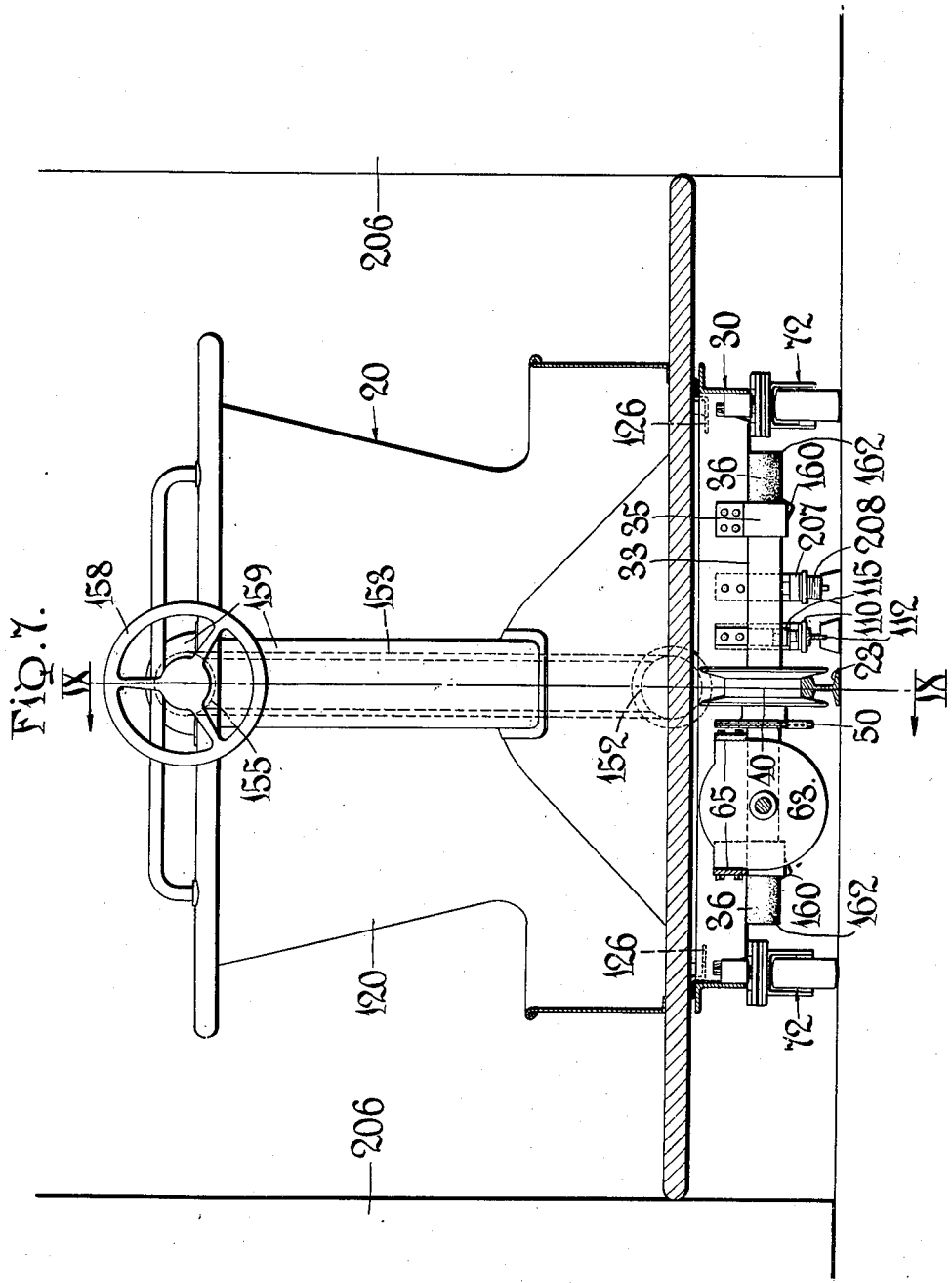

April 2, 1940.  N. BARTLETT  2,196,093
AMUSEMENT RIDE
Filed April 2, 1938  6 Sheets-Sheet 5
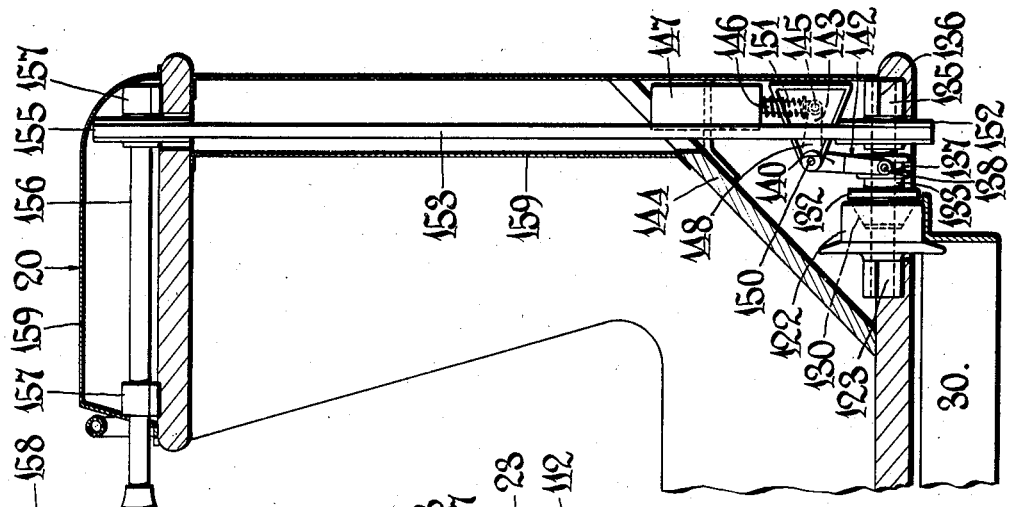
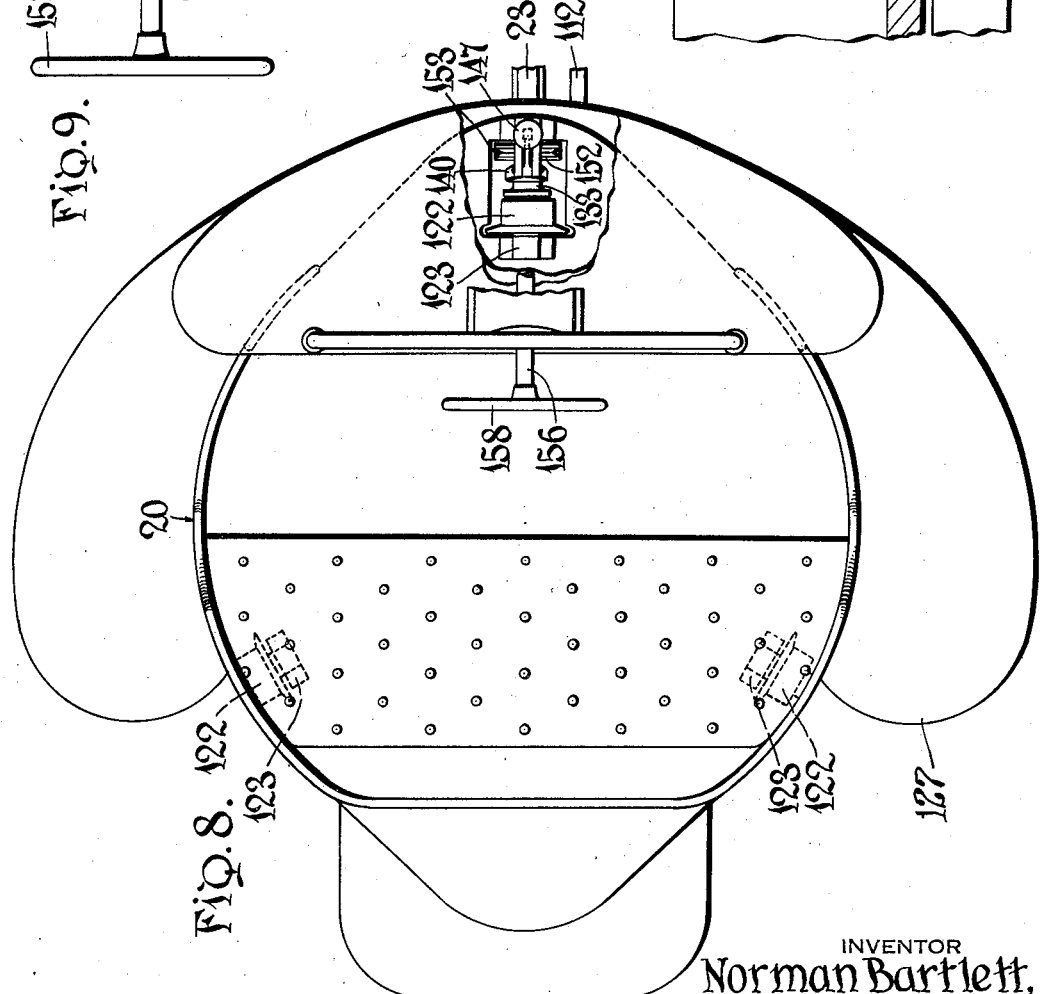
INVENTOR
Norman Bartlett,
BY
Bean, Brooks, Buckley & Bean
ATTORNEYS

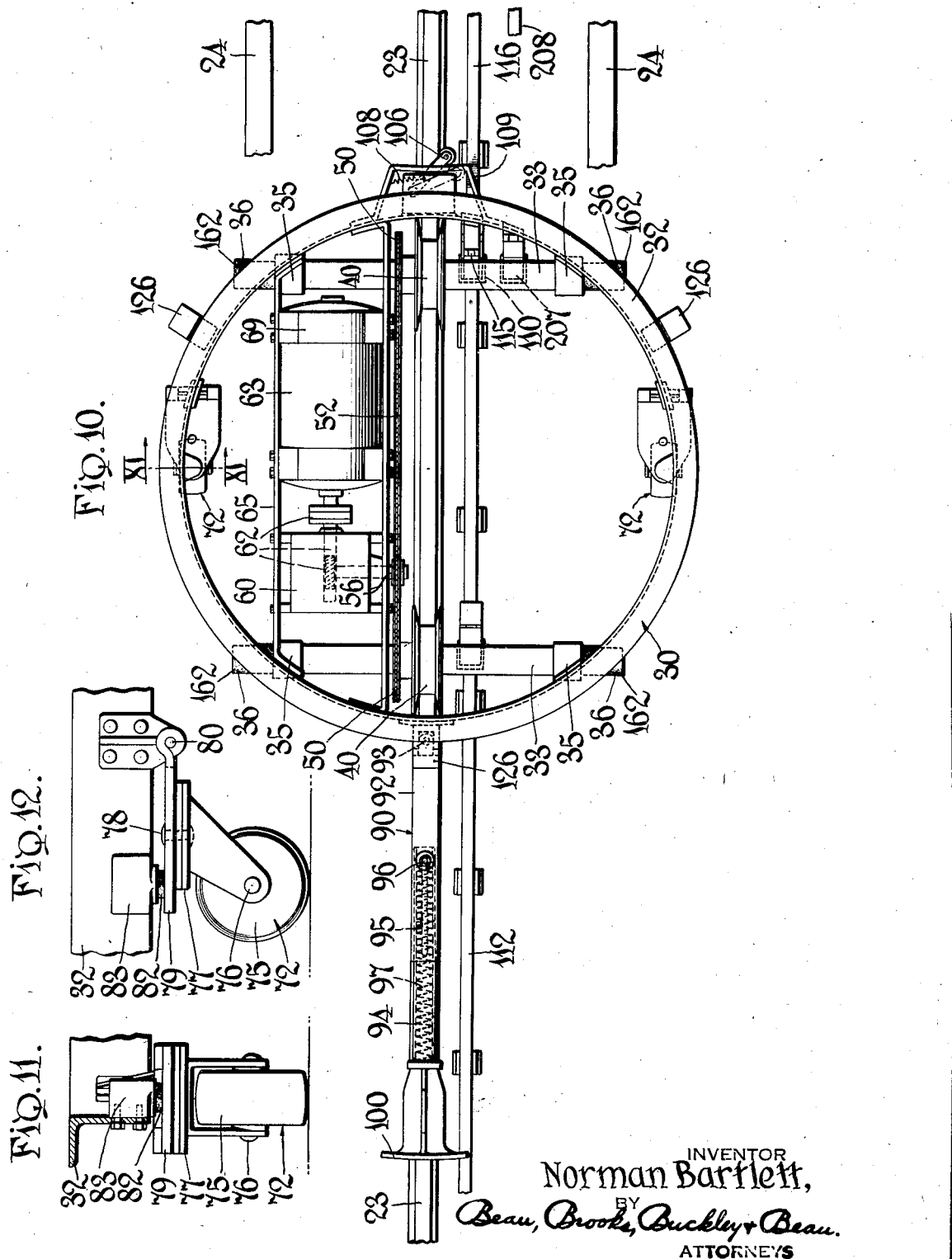

Patented Apr. 2, 1940

2,196,093

UNITED STATES PATENT OFFICE 2,196,093

AMUSEMENT RIDE

Norman Bartlett, North Tonawanda, N. Y.

Application April 2, 1938, Serial No. 199,684

5 Claims. (Cl. 104—53)

This invention relates to amusement apparatus and it has particular relation to the construction of passenger vehicles, together with control mechanism and scenic or illusory courses through which passengers ride in connection with the operation of the vehicles.

In the type of apparatus or so-called amusement rides with which this invention is concerned, a track is provided through a series of lighted and closed chambers, and in various sections of the chambers, the passengers in successive cars are subjected to speed illusions, spin illusions, storm illusions, etc. For purposes of attracting prospective customers, mirrors are arranged in such manner that reflections as viewed from outside of at least one of the chambers, create an illusion of the vehicle traveling upon a side wall or ceiling of certain sections of the chambers.

A special type of passenger vehicle or car is designed to travel upon a track composed of one or more traction rails and which is laid along the floors of the chamber sections to provide an endless course. Casters are provided adjacent opposite sides of each car for operation on the floor to insure proper vehicle balance, and a revolving body constitutes the upper superstructure of the car. A circular track constructed as a part of a suitable undercarriage supports the revolving body and a special steering mechanism is provided for maintaining desired position of the revolving body on the circular track. The steering mechanism is disconnected at certain locations in the chambers and other arrangements cause the revolving body to revolve for certain periods out of control, all of which adds to the interest and amusement of the apparatus.

A suitable electric motor and automatic brakes are provided for controlling the operation of the car and automatic switches are provided for stopping the motor and applying brakes in the event one car collides with another. This arrangement insures safety and prevents damage to parts of the operating mechanism of the cars. Additional motor control devices are included at loading stations or platforms to insure proper electrical connection or disconnection among the operating devices of the car.

One object of the invention is to provide an improved clutch controlled steering mechanism for a passenger car used in amusement rides.

Another object of the invention is to provide in a passenger car an improved clutch controlled steering mechanism which is automatically operable by devices placed in the path of travel of the car.

Another object of the invention is to provide an improved arrangement of electrical contact control apparatus for establishing electrical circuit through an electrically energized rail to a vehicle motor or other operating parts of the vehicle.

Another object of the invention is to provide an improved association between brake and bumper of vehicles operated electrically for automatically applying brakes to the vehicle and stopping an electric motor that applies operating power to the vehicle.

Another object of the invention is to provide an improved transmission or drive gearing from a motor to traction wheels of a passenger car.

Another object of the invention is to provide an improved arrangement of tracks and traction wheels and axles for changing the speed of the vehicle at normal operation of its driving motor.

Another object of the invention is to provide an improved combination of balancing and driving wheels in a vehicle undercarriage.

Another object of the invention is to provide an improved controlling device for electrically driven cars in connection with loading platforms, in order to insure stationary position of the car while passengers are entering or leaving such car.

In the drawings:

Fig. 1 is a diagrammatic plan of the structure of an amusement ride designed according to the invention;

Fig. 2 is a diagrammatic vertical section taken longitudinally of the structure of the amusement ride;

Fig. 3 is a diagrammatic plan of an upper portion of the structure shown in Fig. 2;

Fig. 4 is a fragmentary side elevation illustrating diagrammatically a passenger car, together with track arrangement and operating elements therefor;

Fig. 5 is a diagrammatic front elevation of the passenger car as it appears on a laterally inclined track section;

Fig. 6 is a side elevation, on a larger scale, of a passenger car mounted upon a track and including arrangement of live rail;

Fig. 7 is a vertical section taken substantially along the line VII—VII of Fig. 6;

Fig. 8 is a plan of a passenger car with portions broken away to expose steering control mechanism;

Fig. 9 is a fragmentary vertical section taken substantially along the line IX—IX of Fig. 7;

Fig. 10 is a fragmentary plan of track and live rail construction, together with a plan of an undercarriage of a passenger car from which the passenger compartment or body has been omitted;

Fig. 11 is a vertical section, on a larger scale, taken substantially along the line XI—XI of Fig. 10; and Fig. 12 is a fragmentary side elevation of the structure shown in Fig. 11.

In order that the structure and character of the amusement ride involved in this invention may be properly understood, there are shown several diagrammatic figures of the sections and course of travel through which passenger cars 20 or vehicles are operable upon a track composed of one or more rails 23 and 24. Suitable legends are applied to these figures to indicate different phases of the ride.

Each car 20 is provided with a supporting framework or undercarriage 30 having an annular track 32 and front and rear axles 33 which are mounted in downwardly extending bearing ears 35 secured to the undercarriage. Opposite cylindrical end portions 36 of the front and rear axles 33 project outwardly and laterally beyond the bearing ears 35 and are adapted to serve as traction wheels in a manner to be subsequently described.

Intermediate portions of the front and rear axles 33 are provided with flanged traction wheels 40 which are aligned longitudinally of the track 23 for operation thereon and for travel through the several chambers 42, 43, 44, 45, etc., of the ride. Front and rear sprocket wheels 50 are rigidly mounted upon the axles 33, and an endless block chain 52 is trained about the sprocket wheels 50 and about an intermediate smaller driving sprocket wheel 55 which is supported upon a shaft 56 carried rigidly in a gear box 60. Suitable transmission elements 62 connect the shaft 56 to an electric motor 63 supported at the lower side of the undercarriage 30 upon rigid frame members 65 thereof. The gear box 60 is also mounted upon the frame members 65 and is provided with an idler sprocket wheel 66 rotatedly mounted, as indicated at 67, upon the gear box for directing the block chain 52 about the sprocket wheel 55 and insuring sufficient circumferential driving engagement therewith.

It is to be understood that a conventional type of electric motor 63 is employed and is provided with a built-in automatic brake indicated at 69, and braking action is applied to the motor as soon as the current is switched off. Since each car 20 is relatively light the braking action automatically applied to the motor upon stopping electrical operation thereof is transmitted to the wheels 40 through the driving gearing which connects the motor to the axle and car wheels as described above.

In this type of amusement ride the track 23 is laid upon a floor 70 or other suitable supporting surface and, in order that the car 20 may be properly balanced, casters 72 are connected at substantially diametrically opposite sides of the undercarriage. Each of these casters includes a roller 75 rotatably mounted upon a horizontal axle 76 which is carried in a swivel member 77, the upper portion of which is swiveled, as indicated at 78, upon a horizontal hinge plate 79. A suitable pin 80 connects the plate 79 for pivoting about a horizontal axis and supports the caster upon the lower side of the undercarriage. A buffer 82 composed of rubber or other yieldable material is mounted in a casing 83 that is rigidly secured to the lower portion of the undercarriage and projects downwardly for contacting the upper surface of each plate at a location spaced from the hinge pin. Therefore, if the car tilts laterally it is cushioned by the buffer 82.

A safety device or bumper 90 including a tube 92 is provided with a universal connection 93 securing it to the rear portion of each undercarriage. A second section of tube 94 is telescoped into the tube 92 and is provided with an inner slotted portion 95 to provide for passage thereof past a pin 96 rigidly secured transversely through the first tube 92. A suitable coil spring 97 is disposed inside the tubes between the inner end of the tube 92 and the outer end of the other tube 94. A buffer head 100 extends rigidly from the outer end of the tube 94 and is provided with a flanged wheel 102 rotatably mounted, as indicated at 103, between a pair of depending legs 105 of the buffer head. The wheel 102 supports the buffer head at such height as to be in horizontal alignment with a pivotal switch lever 106 at the front end of the car. This switch lever 106 when operated discontinues the supply of electrical current to the motor 63, and hence, if one car overtakes another the switch lever 106 in the overtaking car strikes the buffer head in the car ahead and the brake in the motor thereof is automatically applied. A coil spring 108 is connected to the lever 106 and to a bracket 109 that is secured to the front portion of the car and pivotally supports the lever.

A frictional switch 110 extending from the circular track 32 adjacent each end portion of the car connects the motor 63 to a live rail 112 during the operation of the car. This switch is yieldably slidable on the live rail 112 and is movable upwardly to contact a second switch 115 that is disposed directly above it and is also secured to the circular track 32. This action is effected as a result of travel over elevated portions 116 of the live rail for purposes that will appear as the description proceeds.

Each car includes an upper body or passenger compartment 120 which is mounted upon the circular track 32 by means of flanged wheels 122 circumferentially spaced about the track and carried upon axles 123 disposed in bearings that are formed in the car body 120. These wheels 122 support the body so as to provide for rotation thereof about a substantially vertical axis. Suitable plates 126 rigidly secured to the bottom of the car body extend beneath the marginal portions of the track 32 and prevent vertical displacement of the body therefrom. Lateral wings 127 on the lower opposite side portions of the body 120 serve as platforms or steps to facilitate entry of the passengers into, and their exit from, the car.

One of the flanged wheels 122 (Fig. 9) has a cone shaped recess 130 formed coaxially therein for receiving a cone shaped clutch member 132 that is formed upon the inner end of a clutch sleeve 133. This wheel 122 is rigidly connected to an outward axle extension 135 supported in a bearing 136 and the sleeve is axially slidable and keyed upon this extension. An annular circumferential channel 137 formed upon the sleeve 133 receives therein a trunnion 138 provided upon each leg of a bifurcated arm 140 of a bell crank 142. The outer end of the other arm 143 of the bell crank is pivotally connected, as indicated at 145, to the lower end extension 146 of a solenoid 147 that is rigidly carried upon the body framework 144. A suitable bracket 148 rigidly mounted upon the car body pivotally supports the bell crank 142 at the junction of its arms upon a suitable pivot bolt 150. A coil spring 151 surrounds the lower end portion of the extension 146 and it is confined between the outer end of the arm 143 and the lower end of the solenoid 147.

When the solenoid 147 is energized the bell crank 142 is pivoted in a counterclockwise direction as viewed in Fig. 9 and disengages the clutch member 132 from the wheel 122. When the solenoid is de-energized the spring 151 forces the clutch member 132 back into clutching engagement with the wheel 122 and normally maintains it in such engagement.

A grooved pulley 152 rigidly connected to the axle extension 135 receives an endless belt 153 which can be in the form of a conventional V-belt, and the latter is trained about a similar upper grooved pulley 155 that is rigidly connected to a substantially horizontal steering post 156. Suitable bearings 157 rotatably support the steering post upon the upper portion of the car body and a steering wheel 158 operable by a passenger in the body 120 can be rotated to revolve the body upon the track so long as the solenoid 147 is not energized. Casing structure 159 surrounds and protects the steering post and V-belt gearing. The operation of the solenoid is effected from a remote location; for example, at any location desired the elevated portions 116 of the live rail can be provided so as to cause the lower switch arm 110 to engage the upper switch arm 115 and thus cause energization of the solenoid 147. Conventional electrical connection is provided between the switch 115 and the solenoid. One arrangement for effecting this action is shown in Fig. 5 wherein the floor upon which the track is laid is inclined laterally in order to tilt the car. The raised portion of the live rail causes the solenoid to operate the clutch element out of engagement with the wheel 122, and hence, the car is then out of control so far as concerns the operation of the steering wheel. It is apparent that the disconnection of the steering wheel for operating the car body upon the circular track can be effected at as many locations as desired, regardless of whether or not the car is laterally tilted. At certain locations in the course traversed by the track it is desirable to operate the car at a slower speed than normal, and to this end, the outer extremities 36 of the axles are designed to ride up upon the raised rails 24 which are slightly elevated with respect to the central rail 23. Therefore, the wheels 40 are raised therefrom. So long as the ends of the axles operate upon these elevated rails the live rail is also correspondingly elevated to insure proper contact of the switch member 110 therewith. The surface of the rails 24 can be covered with rubber or other suitable material 162 to insure proper traction, or the ends of the axles can be so covered. In order that the car can be properly guided upon the double tracks the bearing ears 35 are provided with rounded leading surfaces 160 which prevent the axles from being accidentally displaced or disaligned from the tracks.

After the cars have completed a trip around the track and approach a loading platform 161 the switch member 110 engages an upwardly and downwardly movable pair of insulating rail sections 163 arranged adjacent the live rail 112. These rail sections 163 are slightly inclined adjacent their opposite ends and the movement of the car thereover releases the switch 110, which rides upwardly thereover, from the live rail and the car is then automatically stopped as previously indicated.

Normally upright parallel link arms 165 are provided with upper pivotal connections 166 supporting the rails and also have lower pivotal connections 167 on the floor 70. At least two of these arms 165 are provided with parallel arms 168 rigidly projecting at angles thereto and are connected by a link 169 pivoted at its ends to the upper portions of the arms 168. A lever arm 170 is rigidly connected to one of the arms 165 and is rockable about one of the pivotal connections 167. An upper pivotal connection 172 on this lever connects the latter to the lower end portion of a pedal 175 that is vertically slidable in the platform 162. By depressing the pedal 175 the insulating rails 163 are lowered and the switch 110 is then correspondingly lowered into contact with the live rail 112. A coil spring 176 connected to an outer end portion of one of the arms 168 and to the floor 70 is normally under tension and returns the rails to their elevated position as soon as the pedal is released. A suitable stop 177 on the platform arrests movement of the arm against the action of the spring 176, and thus the rail supporting link arms 165 are normally disposed in an upright position.

Passengers enter the structure of the amusement ride at a location indicated by the arrow 200 and then proceed by means of stairs 202 overreaching the track to the loading platform 161. If desired preliminary amusement features can be provided for the passengers in the chambers 203 from which the platform is approached from the direction of the arrow 205.

After passengers are loaded on one of the cars 20, the pedal 175 is operated to lower the switch 110 into contact with the live rail 112 and the car then enters the body of the ride through swinging doors 206. These doors can be electrically opened by completing conventional circuits (not shown) which are energized by contact of a switch 207 on the track 32 with a live rail section 208 (Fig. 7). Any number of doors 206 can be located as desired at the entrances of various chambers indicated in Fig. 1.

As the car enters the "spin illusion" of the chamber 42, the axle extensions 36 ride upwardly upon the slow speed rails 24 to retard the car. As a result of suitable lighting in the chamber the desired illusion is effected. The same is true with regard to the chamber 43 in which a "banking" and "storm illusion" is effected.

After leaving the chamber 43 the car is directed on the single rail 23 to a ramp 210 up which the car is driven at slow speed upon the rails 24. From the ramp 210 the car again resumes its normal speed and is driven along the track upon a balcony 212 at the entrance of which the rail 112 is in such raised position as to operate the switch 110 automatically against the switch 115 to complete the electric circuit to the solenoid 147 and, as a result, disconnect the steering wheel. The track can be tilted at this location, as shown in Fig. 5, to provide for indiscriminate revolving of the car out of control. Spectators outside the structure of the amusement ride and from the position indicated at 215 can view this operation. Before the car leaves the balcony to enter the chamber 44 the steering control is again automatically connected and rendered operative.

The car travels at slow speed in the manner previously described as it proceeds through the chamber 44. The interior of this chamber can be viewed from the location of the spectators indicated at 215 by means of a mirror 216 arranged at an angle in the ceiling of the chamber. To the spectators the car appears to be traveling upon a vertical wall of the chamber and the actual vertical walls appear to be the floor and ceiling of the chamber. In order to promote this illusion, furniture 217 and lighting fixtures 218 are secured to these vertical walls and a suitable dummy 219 is seated at the furniture. In addition to these features, the walls of the chamber are so painted as to simulate a floor and ceiling, and the floor is so painted as to simulate a vertical wall of the chamber.

Upon leaving the chamber 44, the car proceeds at normal speed down the incline or ramp 210 to the rear of the amusement ride structure, thence returns toward the front thereof through doors 206, and at slow speed traverses the "speed illusion" chamber 45 provided with suitable lighting effects to create the illusion desired. In connection with the chamber 45, which is substantially in the form of a horizontally disposed cylinder or tubular structure, the mirror 42 is disposed in spaced relation adjacent the inner chamber end and in approximate axial alignment with the chamber. Spectators or prospective patrons at 215, or at adjacent locations outside the ride structure, can look through the cylindrical chamber into the mirror 42 and the reflected illusion is thus exhibited to them.

The amusement features of the ride will have been traversed after the car is driven from the chamber 45, and the car is returned to the loading platform for reloading, or is aligned with other cars awaiting loading. A number of cars can be unloaded simultaneously along the front side of the structure indicated at 220 and passengers can exit through a one-way gate 222.

Although various features of the invention have been shown and described in detail, it will be apparent to those skilled in the art that the invention is not so limited, but that various changes can be made therein without departing from the spirit of the invention or from the scope of the appended claims.

I claim:

1. In an amusement apparatus, a motor driven vehicle having a guiding course over which it is operable, said motor driven vehicle including a supporting structure, a passenger compartment, means supporting said passenger compartment mounted for rotation about a substantially vertical axis upon said supporting structure, a disengageable steering mechanism on the passenger compartment normally operable to revolve the latter upon the said supporting structure, and means operable from a remote location for disengaging the steering mechanism whereby the passenger compartment is freely rotatable out of control of the occupants thereof.

2. In an amusement apparatus, a motor driven vehicle having a guiding course over which it is operable, said motor driven vehicle including a supporting structure, a circular track on said supporting structure, a passenger compartment mounted upon said track, a steering wheel in the passenger compartment, mechanism gearing the steering wheel to the track for operating the passenger compartment thereon, remote control means associated with the mechanism for disengaging the steering wheel from said mechanism whereby the passenger compartment is free to revolve about the circular track with the steering wheel inoperative.

3. In an amusement apparatus, a motor driven vehicle having a guiding track upon which it is operable, said track including a laterally inclined section for tilting the vehicle as the latter passes over said section, said motor vehicle including a supporting structure, together with a normally horizontal circular track carried on said supporting structure, a passenger receiving body rotatedly mounted upon said circular track and being subjected to uneven weight distribution when carrying one or more passengers, a steering wheel in said body, mechanism gearing the steering wheel to the circular track for manually operating the body thereon, means rendering said mechanism unresponsive to the operation of said steering wheel while the vehicle is traversing said laterally inclined section, whereby the heavier portion of the weight in the body moves by gravity toward the lower side of said inclined section.

4. In an amusement apparatus, a motor driven vehicle having a guiding course over which it is operable, two switch members one of which is yieldable toward and away from the other and both of which are connected to the vehicle, and a live rail along the course normally contacting the yieldable switch member and having an offset portion for urging the yieldable switch member into contact with the other switch member as the vehicle travels adjacent the offset portion of the live rail.

5. In an amusement apparatus, an electric motor driven vehicle including a supporting structure, a passenger compartment dirigibly mounted upon said supporting structure, steering means for dirigibly operating said passenger compartment upon said supporting structure of the vehicle, a track carrying said vehicle along a predetermined path and having a live rail disposed adjacent thereto, a yieldable switch member on the vehicle normally contacting the live rail for transmitting energy to the driven vehicle, a second switch member on the vehicle adjacent the yieldable switch member, said live rail having an offset portion in the path of the yieldable switch member whereby the latter is operable into contact with said second switch member for electrically rendering said means inoperative.

NORMAN BARTLETT.